(12) United States Patent
Judge et al.

(10) Patent No.: US 7,091,881 B2
(45) Date of Patent: Aug. 15, 2006

(54) INTEGRATED HOVER DISPLAY WITH AUGMENTED APPROACH TO HOVER SYMBOLOGY CUEING FOR DEGRADED VISUAL ENVIRONMENTAL CONDITIONS

(75) Inventors: John H. Judge, Woodbury, CT (US); John J. Occhiato, Derby, CT (US); Lorren Stiles, Palm City, FL (US); Vineet Sahasrabudhe, Hamden, CT (US); Margaret A. MacIsaac, Woodbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 11/111,473

(22) Filed: Apr. 21, 2005

(65) Prior Publication Data

US 2005/0237226 A1    Oct. 27, 2005

Related U.S. Application Data

(63) Continuation-in-part of application No. 10/816,218, filed on Mar. 31, 2004.

(60) Provisional application No. 60/458,257, filed on Mar. 31, 2003.

(51) Int. Cl.
*G01C 21/00* (2006.01)

(52) U.S. Cl. .................. 340/979; 340/946; 340/967; 340/973; 340/974; 701/14

(58) Field of Classification Search ............... 340/973, 340/974, 975, 979, 980, 967, 946, 945; 701/4, 701/5, 7, 9, 3, 14
See application file for complete search history.

(56) References Cited

U.S. PATENT DOCUMENTS

| | | | | |
|---|---|---|---|---|
| 3,577,120 | A | * | 5/1971 | Sherbert, Jr. ............... 340/973 |
| 4,182,171 | A | * | 1/1980 | Looker ..................... 73/178 R |
| 5,150,117 | A | * | 9/1992 | Hamilton et al. .......... 340/973 |
| 5,296,854 | A | | 3/1994 | Hamilton et al. .......... 340/980 |
| 5,448,233 | A | | 9/1995 | Saban et al. ................ 340/963 |
| 5,859,597 | A | | 1/1999 | Cornelio et al. ........... 340/946 |
| 6,072,420 | A | | 6/2000 | Hellsten .................... 342/25 R |
| 6,208,270 | B1 | | 3/2001 | Dunn ........................ 340/961 |
| 6,216,065 | B1 | | 4/2001 | Hall et al. .................... 701/16 |
| 6,255,965 | B1 | | 7/2001 | D'Orso ...................... 340/946 |
| 6,285,926 | B1 | * | 9/2001 | Weiler et al. .................. 701/4 |
| 6,686,851 | B1 | * | 2/2004 | Gordon et al. ............. 340/970 |
| 6,798,423 | B1 | | 9/2004 | Wilkins et al. ............. 345/618 |

* cited by examiner

*Primary Examiner*—Brent A. Swarthout
(74) *Attorney, Agent, or Firm*—Carlson, Gaskey & Olds

(57) ABSTRACT

A flight control system includes a primary flight display having a hover display which facilitates operations in DVE conditions. The hover display includes a radar altitude display, heading drift symbology and lateral drift symbology which assists pilots in the detection of drift, which is common in DVE situations and to provide the pilot with a salient cue pertinent to the approach to hover and landing.

15 Claims, 9 Drawing Sheets

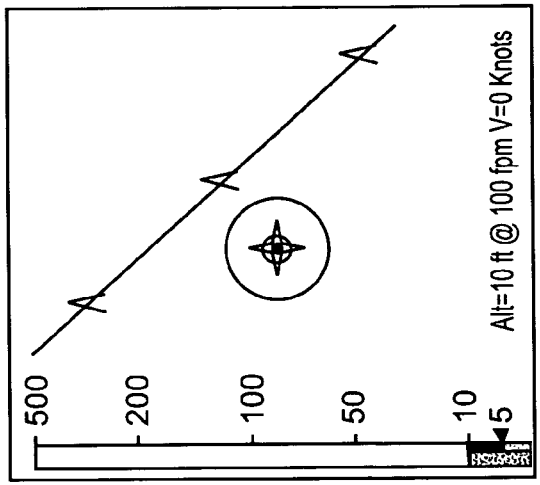

FIG. 3A

Alt=93 ft @ 600 fpm V=30 Knots

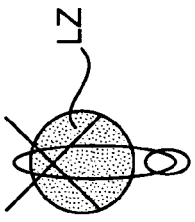

APPROACH TO HOVER, AIRCRAFT MOVING FORWARD LONGITUDINALLY BUT SLOWING DOWN INDICATED BY ACCEL BALL RETRACTING DOWN VELOCITY VECTOR

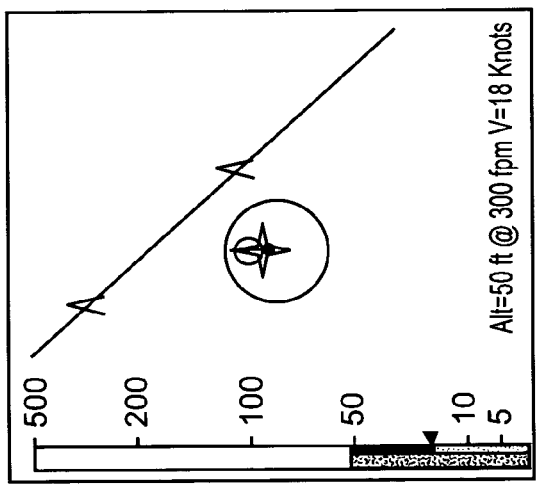

FIG. 3B

Alt=50 ft @ 300 fpm V=18 Knots

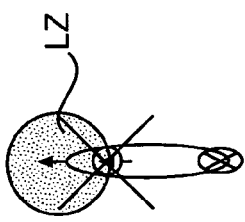

AIRCRAFT COMING TO A HOVER AT 50 FEET OVER GROUND. DECENT RATE SLOWED DOWN INDICATED BY REDUCTION IN ALT TREND BAR, INDICATED BY SMALL VECTOR, AND ACCEL BALL APPROACHING HOVER POINT.

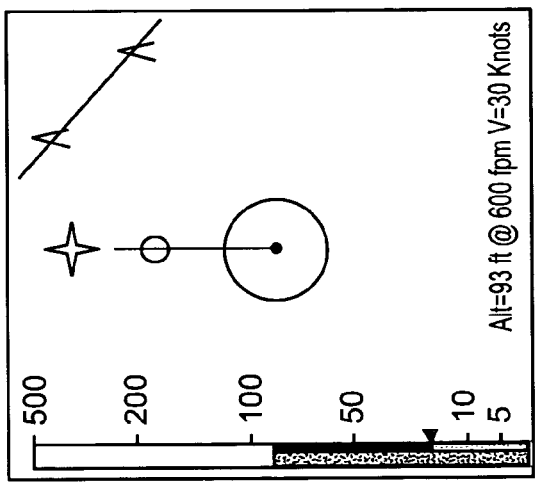

FIG. 3C

Alt=10 ft @ 100 fpm V=0 Knots

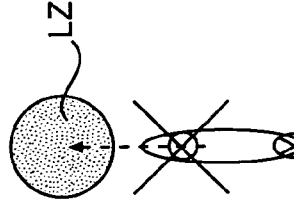

HOVER

INTEGRATED HOVER DISPLAY WITH AUGMENTED APPROACH TO HOVER SYMBOLOGY CUEING FOR DEGRADED VISUAL ENVIRONMENTAL CONDITIONS

The present application is a Continuation-in-Part application of U.S. patent application Ser. No. 10/816,218, filed Mar. 31, 2004, which claims priority to U.S. Provisional Patent Application Ser. No. 60/458,257, dated Mar. 31, 2003.

BACKGROUND OF THE INVENTION

The present invention relates to instrumentation for a rotary wing aircraft, and more particularly to an integrated hover display to provide a pilot with augmented symbology cueing which facilitates approach and landing when visually-restrictive conditions are encountered.

Rotary wing aircraft are routinely required to approach and land at remote sites without navigation guidance or acceptable visual conditions. Often the topography, ground hazards, obstacles and weather in the area are unknown or changing. Upon arrival at the remote site, the pilot must typically make critical judgments based on incomplete or inaccurate data in order to determine the proper procedure to approach and land. If the terrain condition is such that dust, snow, sand, or the like will be stirred by rotor downwash, the rotary wing aircraft may become engulfed in a cloud of visually-restrictive material. This is commonly referred to as a degraded visual environment (DVE) or a "brownout/whiteout."

Research including literature reviews, pilot interviews, and military incident reports indicate that incidents due to DVE conditions often occur because the pilot becomes spatially disoriented due to loss of visual references. During approach to hover and landing, the pilot manipulates the aircraft controls to conduct a constant deceleration of longitudinal velocity while coordinating a rate of descent to the ground in such a way as to arrive at the ground with little or no forward velocity and a low rate of descent. In addition to controlling a rate of descent, the pilot must also compensate for forward, aft, lateral, and heading drift.

Pilots rely on extensive training to compensate for landings in DVE conditions. Pilot workload and cockpit procedures such as cross checks greatly increase during DVE conditions as the pilot must scan multiple flight display instruments to compensate for a lack of visual landing references. Such an increase in workload further complicates tactical situations.

In addition to training pilots to effectively deal with DVE conditions, there exist partial solutions which include conventional hover displays. Conventional hover displays include a rate of descent indicator which utilizes data from pitot static sensors. Pitot static sensors provide information relative to air mass and may be inaccurate at low speed due to the influence of rotor downwash. Because of this, pilots currently estimate rate of closure to the ground through visual references, augmented by relatively crude analog indicators of height above ground as sensed by a radar altimeter. Furthermore, as the terrain itself may be uneven and cloaked due to the DVE condition, the pilots burden of assuring that the landing gear settles without undue lateral rolling of the aircraft at touchdown is further complicated.

Fore, aft, lateral, and heading drift are also components that may increase spatial disorientation in DVE situations. Conventional hover displays fail to provide cuing symbology that effectively displays such drift components.

Although rotary wing aircraft are effectively operated in DVE conditions, conventional displays have, however, heretofore not provided an integrated hover display which significantly minimizes the potential for spatial disorientation in a DVE condition.

Accordingly, it is desirable to provide an integrated hover display with augmented symbology cueing to facilitate approach, hover, and landing in DVE conditions.

SUMMARY OF THE INVENTION

An integrated display system according to the present invention may include a primary flight display having a hover display which facilitates operations in a DVE condition. The hover display may include a radar altitude display, heading drift symbology and lateral drift symbology.

The radar altitude display provides the pilot with the current value of height above ground. The radar altitude display may also incorporate an altitude ascent/descent trend tape, which may be overlaid onto the radar altitude scale to indicate the radar altitude trend. That is, the altitude ascent/descent trend tape projects from the current value of height above ground to a future value of height above ground on the same analog scale. The altitude ascent/descent trend tape is also preferably color-coded to provide an indication of altitude ascent/descent rate. For example, the altitude ascent/descent trend tape may be green if the rate of closure is below an acceptable ascent/descent rate relative to the ground, yellow if the rate of closure is close to acceptable altitude ascent/descent limits, or red if the rate of closure is above acceptable altitude ascent/descent limits. Thus, the radar altitude display provides a pilot with an estimate for the rate of closure to the ground to facilitate operating in DVE conditions.

The hover display may also include heading drift symbology, which provides a pilot with symbolic representation of heading drift. The heading drift symbology may include a heading error deviation bar that extends from either side of a current aircraft heading depicted in a compass rose. The length of the heading error deviation bar depicts the difference between the existing heading and the desired heading at the beginning of the approach. The heading error deviation bar is also preferably color-coded to represent the amount of heading drift.

The hover display may also include lateral drift symbology, which provides a pilot with symbolic representation of lateral drift. The lateral drift symbology includes a color-coded lateral error bar that extends from a symbol representing the aircraft's current position. The lateral error bar is related to aircraft ground speed such that the bar increases in proportion to the ground speed to indicate that lateral velocity is greater than zero. Preferably, the length of the lateral error bar is determined by calculating the lateral component of a velocity vector in the hover display and multiplying by a scale factor to provide an emphasized representation of the aircraft's lateral drift.

The heading draft symbology and the lateral drift symbology as described herein assists pilots in the detection of drift, which is common in DVE situations, to provide the pilot with a salient cue pertinent to the approach to hover and landing.

The present invention therefore provides an integrated hover display with augmented symbology cueing to facilitate approach, hover, and landing in DVE conditions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3A is the hover display of FIG. 2 displaying symbology illustrating the aircraft approaching a desired landing point;

FIG. 3B is the hover display of FIG. 2 displaying symbology illustrating the aircraft closing over the desired landing point;

FIG. 3C is the hover display of FIG. 2 displaying symbology illustrating the aircraft hovering over the desired landing point at 10 feet AGL and beginning a descent;

DETAILED DESCRIPTION OF THE PREFERRED EMBODIMENT

Figure 1:
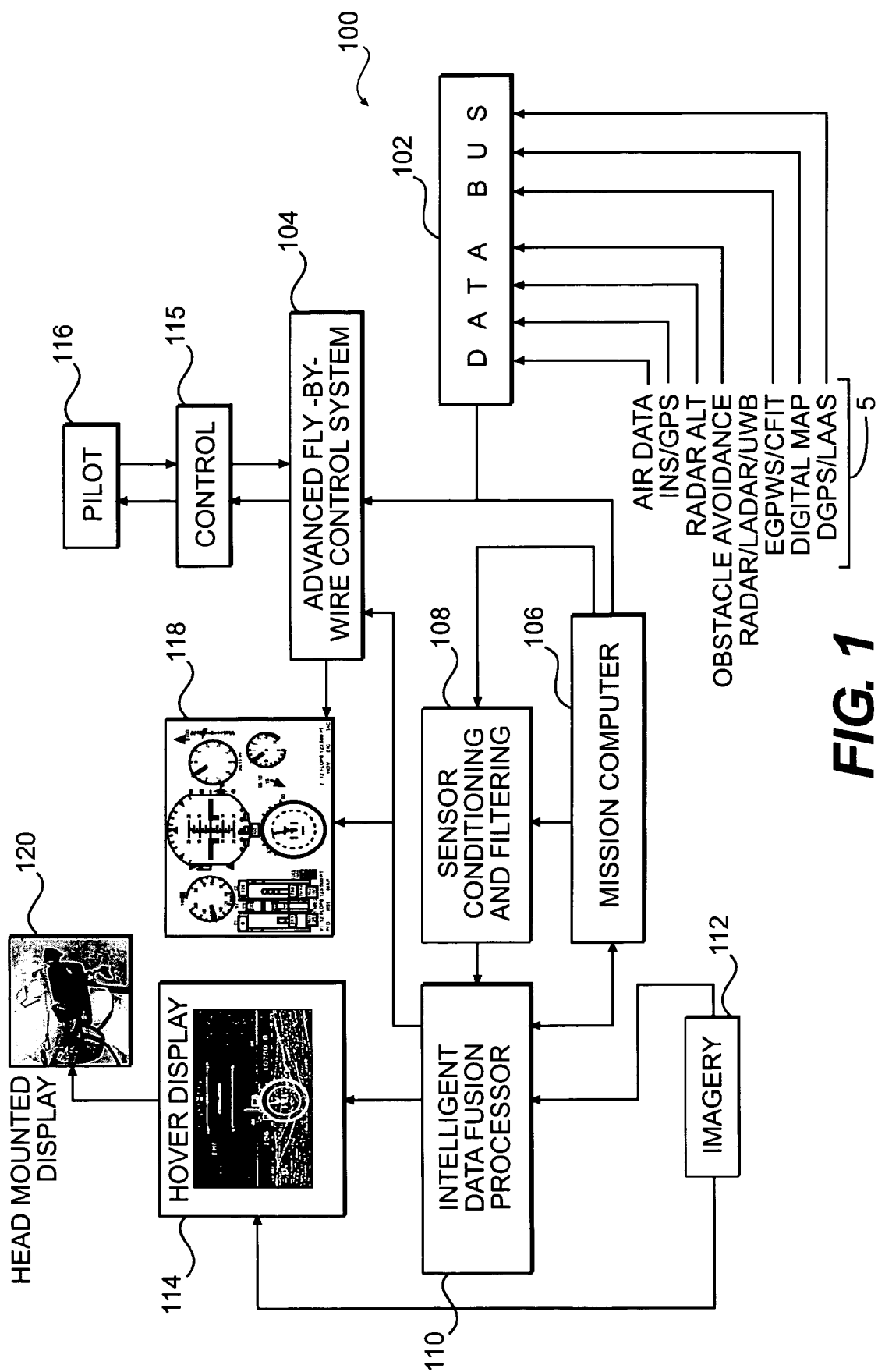
FIG. 1 is system architecture block diagram of an embodiment of the invention.

FIG. 1 illustrates a general system architecture block diagram view of a flight control system 100 which facilitates operations in a degraded visual environment (DVE). Preferably, the flight control system 100 includes a plurality of interconnected systems to assist a pilot in operating a rotary wing, vertical take off and landing (VTOL), aircraft. Typically, the systems include FBW flight control, display, sensor, imagery, navigation, data fusion, processing, and control.

As described in greater detail below, the flight control system 100 may include a data bus 102 with inputs from a sensor system S, a mission computer 106, intelligent data fusion processor 110, a sensor conditioning and filtering system 108, a fly by wire (FBW) flight control system 104, and an imagery system 112.

The sensor system S may include a variety of sensors for surveying the environment and providing information to the pilot to augment the pilot's visual cues. This environmental information may be presented to the pilot in the form of a synthetic imagery which overlays the outside scene, and/or symbology. The sensor system S may include, for example, a radar altimeter, air data system, inertial navigation systems, traffic alert and collision avoidance system, Enhanced Ground Proximity Warning System (EGPWS)/Controlled Flight Into Terrain (CFIT), digital map, terrain database, global positioning system, Differential Global Positioning System (DGPS), microwave radar, 35 GHz wave scanning beam radar as well as others. Imagery information may also be collected by an imaging system 112 such as a forward looking infrared (FLIR) camera, and/or video camera.

The mission computer 106 communicates with the sensor system S through the data bus 102 to provide flight information, including velocity, height above ground, groundspeed, ground track, wind direction, wind speed, location of the landing zone, location of other aircraft in the formation, aircraft performance, etc. This information is generally information that cannot normally be gathered by purely visual attentiveness during approach and landing, especially in DVE conditions.

The sensor conditioning and filtering system 108 filters data obtained from the data bus 102 to extract particular data signals.

The mission computer 106 and the sensor conditioning and filtering system 108 provide data to the data fusion processor 110, which analyzes the data and compiles the various data into a combined output. That is, the data fusion processor 110 fuses together the wide variety of information available and converts the information into a symbology format for pilot display. For example, the data fusion processor 110 may combine: (1) the imagery information from the FLIR camera; (2) visual information from the camera system; (3) environmental information collected by the sensor system S; and (4) positional information generated by the mission computer 106 into symbology which is displayed in a hover display 114. The data fusion processor 110 may also fuse together the sensor information and imagery information to create a synthetic imagery, which represents terrain that may not be visible under DVE conditions.

The flight control system 100 may also include a control system 115 incorporating controls that are employed to enable a pilot 116 to request information from the flight control system 100, or convey intent, so that the mission computer 106 may determine what information is to be presented, at what time, and in what format for the task at hand.

As previously stated, the pilotage of the aircraft is preferably through a FBW system 104. The FBW system 104 preferably contains inputs that facilitate pilot control of the aircraft. The flight control system 100 may include control logic which enables a pilot to command a stabilized flight path, hold hover position and altitude, and execute a landing in zero or near zero visibility. Additionally, variable limits may be implemented into the FBW system 104 in response to the height of the aircraft above ground and its rate of descent. The primary input to the FBW system 104 is from the data bus 102, the mission computer 106, the control system 115 and the data fusion processor 110. Preferably, the data obtained from the data bus 102 is fed to the mission computer 106, which outputs signals to the FBW system 104 to selectively autopilot the aircraft in close proximity to terrain. That is, information from the data fusion processor 110 is provided to the FBW system 104 so that the combined information from the data fusion processor 110 may be used to autopilot the aircraft so that the aircraft can automatically avoid terrain and obstacles that have been detected by the various systems. The fusion of the various systems provides an autopilot of greater fidelity which facilitates a more aggressive flight profile.

The data fusion processor 110 also communicates information to the primary flight display 118 and to the hover display 114 in order to generate appropriate symbology from the fused information.

The hover display 114 can be implemented in any number of ways known to one of ordinary skill in the art, including but not limited to a heads down display, non-tracked symbology, etc. Preferably, however, a helmet mounted display (HMD) and a heads up display (HUD) are used. The HMD 120 provides a field of view with visually coupled information to the pilot to augment the natural out-the-window view. The information presented on the HMD 120 is stabilized in conformity to overlay the outside scene through the utilization of a head-tracking device. Preferably, the H also permits the pilot to cue on board systems to points of interest the pilot is viewing in the outside scene. The HMD may be augmented by other panel-mounted displays to enable transfer of information to the system. Generally speaking, the HUD provides the same information through a fixed position system.

Within the primary flight display 118 (depicted in FIG. 5), the hover display 114 may provide specific symbology to facilitate approach, hover and landing/take-off in DVE conditions. The hover display 114 may include symbology that facilitates precise pilotage cueing in the approach to hover. For example, the hover display 114 may include: reference to aircraft velocity, location relative to the planned landing area, altitude, and rate of descent. More importantly, trend information may also be provided to assist the pilot in understanding what will be the future state of the aircraft. Additionally, the hover display 114 may provide a pilot with data fused symbology such that the pilot is made aware of unsafe landing areas. The symbology provided by the hover display 114 is presented in a single, integrated data set to reduce pilot workload through automatic assimilation (sensor fusion) of data.

Figure 2:
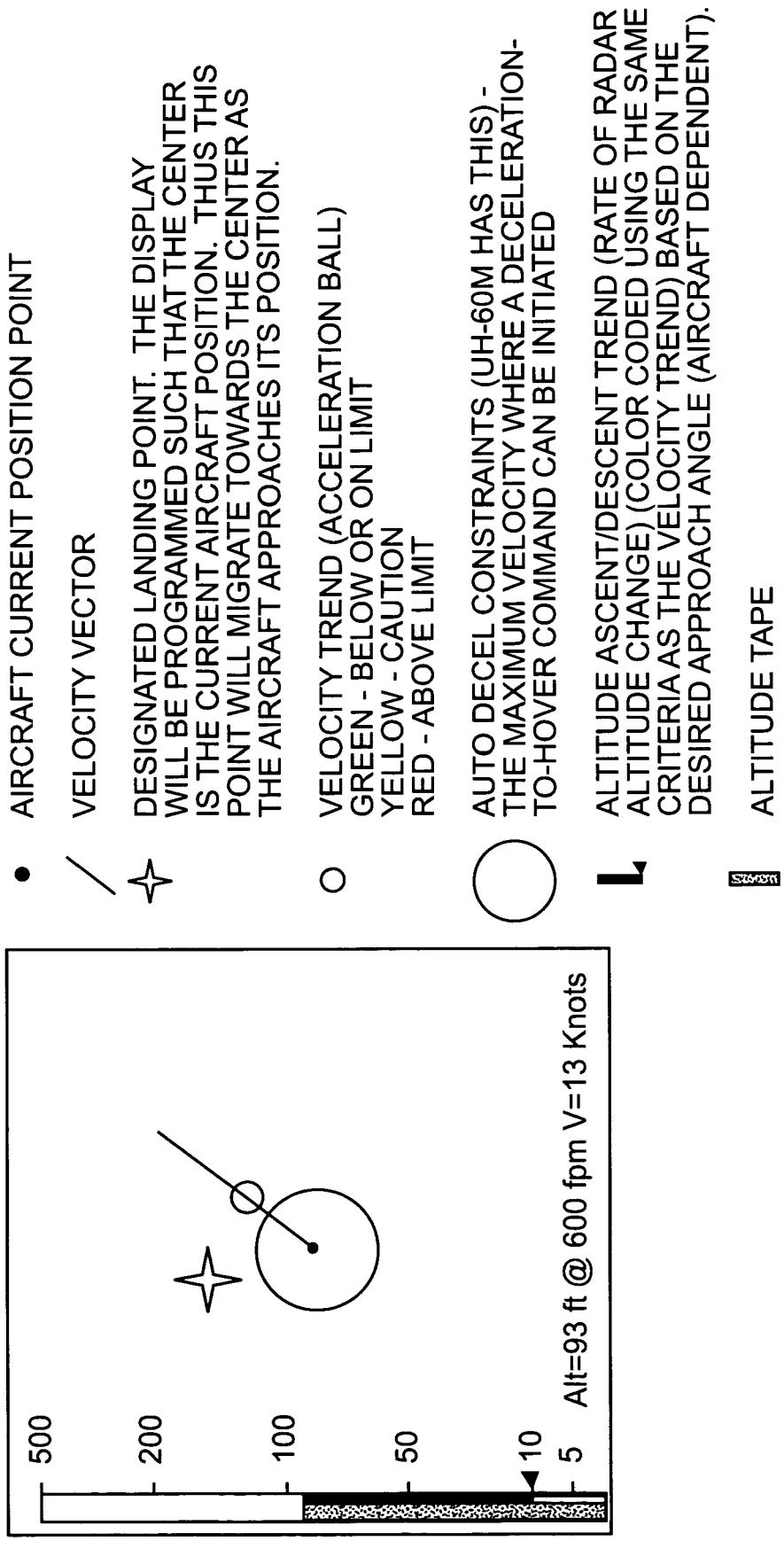
FIG. 2 is one embodiment of a hover display.

Referring to FIG. 2, the hover display 114 preferably combines, inter alia: (1) the distance (relative position between current aircraft position and desired landing point); (2) the aircraft velocity (velocity vector); and (3) the aircraft acceleration (acceleration ball movement relative velocity vector) information all on one display in a symbology format that improves approach, hover and landing/take-off.

The symbology illustrated on the hover display 114 in FIG. 2 exemplary illustrates that the aircraft is close to the desired landing point, however it is translating to the right, away from the desired point. The deceleration rate is within tolerance for the current altitude such that an acceleration ball (i.e., the small circle in line with the velocity vector) would be, for example, green. The velocity trend is displayed by the acceleration ball which moves relative to an end of the velocity vector opposite the aircraft current position point. Here, the acceleration ball is indicating that the aircraft is decelerating as the acceleration ball is on the velocity vector closer to the aircraft current position point. Notably, the acceleration ball is color-coded to provide further indication of acceleration, such as, for example, green for below or on acceleration limits, yellow for close to acceleration limits or red for above acceleration limits. When the velocity vector and acceleration ball are contained within the auto deceleration constraint circle, automatic hover control is preferably initiated by the FBW system.

Figure 2A:
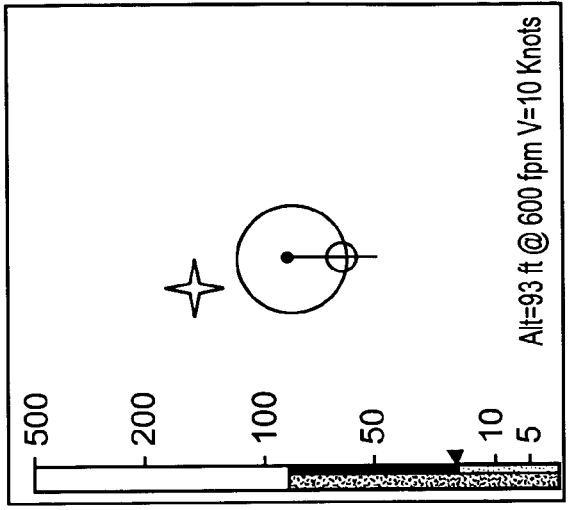
FIG. 2A is the hover display of FIG. 2 displaying symbology illustrating the aircraft translating longitudinally forward at a constant acceleration.

The velocity vector, which extends from the current aircraft position point, extends and retracts in proportion to aircraft ground speed. The direction of the vector on the hover display 114 is equal to the angle between the ground track of the aircraft center of mass and the aircraft centerline. The acceleration ball is referenced to the end of the velocity vector and displays the instantaneous acceleration rate of the aircraft, i.e., the first derivative of the velocity vector. With zero acceleration, the acceleration ball remains at rest over the end of the velocity vector (FIG. 2A). As the aircraft accelerates, the acceleration ball will displace relative to an end of the velocity vector a distance in proportional to the acceleration. The velocity vector will then extend to meet the acceleration ball as the aircraft velocity increases. The value of acceleration used to calculate the position of the acceleration ball is preferably predictive acceleration which factors in instantaneous acceleration, pilot stick position, and flight control dynamics.

Figure 2B:
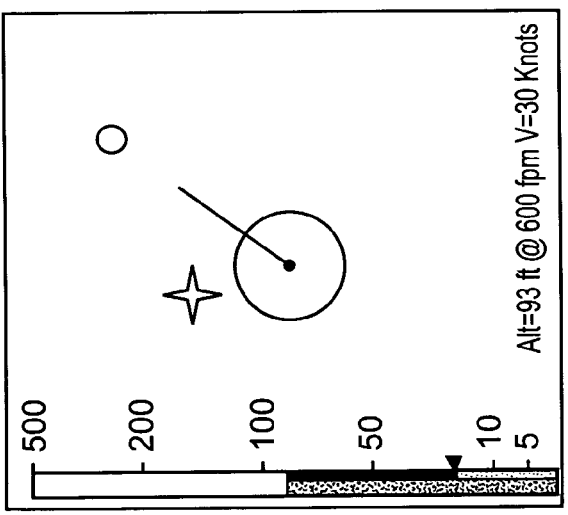
FIG. 2B is the hover display of FIG. 2 displaying symbology illustrating the aircraft center of mass is transiting rightward relative to the aircraft longitudinal axis.
Figure 2C:
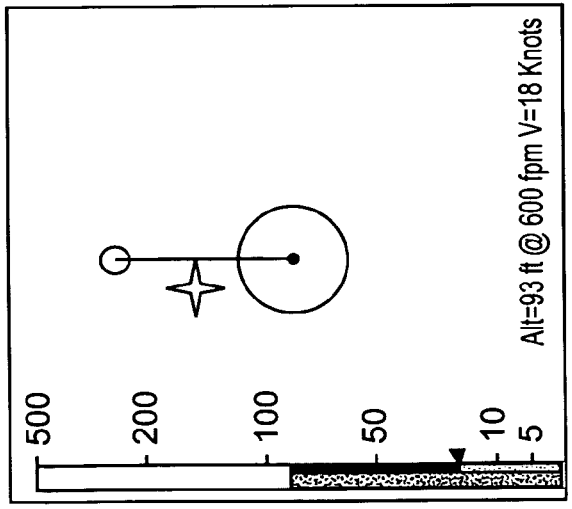
FIG. 2C is the hover display of FIG. 2 displaying symbology illustrating the aircraft translating longitudinally rearward and decelerating.

In further example, if the aircraft is flying straight ahead with no disparity between ground track and aircraft centerline, the velocity vector extends forward/longitudinally up from the current aircraft position point (FIG. 2A). However, if the aircraft ground track is, for example, accelerating forward and tracking right relative the aircraft centerline due to cross-wind or other disturbance, the velocity vector will be angled to the right (FIG. 2B). If the aircraft is moving rearward and decelerating, the acceleration ball is moving toward the current aircraft center point along the velocity vector which is also retracting in length to indicate decreasing velocity (FIG. 2C).

A rate of ascent/descent altitude ascent/descent trend tape indicates a change in altitude trend which predicts the altitude to be approximately 20 ft Above Ground Level (AGL) several seconds in the future. The altitude ascent/descent trend tape is located adjacent to the current aircraft altitude tape and includes an altitude pointer fixed to the end thereof. The pointer increases visibility and attracts pilot attention. The altitude ascent/descent trend tape indicates an altitude ascent/descent trend, i.e., the first derivative of altitude data to predict a trend in the aircraft's altitude. The altitude ascent/descent trend tape indicates the resultant altitude of the aircraft several seconds in the future. Notably, the altitude trend tape, like the acceleration ball is also preferably color coded to provide further indication of ascent and particularly descent, such as green for below a predetermined descent limit relative to altitude, yellow for being close to the predetermined descent limits and red for being above predetermined descent limits relative to altitude.

In FIG. 2, for example only, the altitude ascent/descent trend tape indicates a decreasing altitude trend indicating that the aircraft will be approximately 10 feet AGL several seconds in the future. A text field at the bottom of the display provides quantitative readout of critical information (current altitude, rate of descent, ground velocity) to increase situation awareness.

Referring to FIGS. 3A–3C, the aircraft is moving forward longitudinally (at 30 knts) but slowing as indicated by the acceleration ball retracting down the velocity vector (FIG. 3A). Altitude is also decreasing as indicated by the altitude trend tape. Notably, the display 114 generates symbology to indicate a terrain obstacle such as the displayed power lines. The obstacle location may have been determined by the sensor system, FLIR system, terrain database, or other source. The data fusion processor 110 positions the obstacle in spatial relationship relative to the current aircraft position such that the pilot can manipulate the aircraft to avoid the obstacle. Preferably, the FBW system will automatically adjust the aircraft flight path and override the pilot flight commands should the aircraft flight path be directed toward the obstacle.

In FIG. 3B, the aircraft is coming to a hover at 50 ft. AGL over the landing point. The aircraft has a slight forward velocity (3 knts) but the aircraft is still decelerating as indicated by the acceleration ball which is retracted from the end of the velocity vector. Note that the velocity vector is shorter in FIG. 3B relative to FIG. 3A. Notably, as the acceleration ball and the velocity vector are within the auto decel circle, auto hover mode in the FBW system is available and the pilot need only make final adjustments. The aircraft is also still descending but at a lesser rate.

In FIG. 3C, the aircraft is in a hover at 10 ft AGL over the landing point. Notably, the velocity vector has retracted into the aircraft current position point and the acceleration ball surrounds the aircraft current position point indicating zero forward velocity and acceleration, i.e., steady hover. The aircraft is descending from ten feet but at a slower rate than FIG. 3B as indicated by the shortened altitude trend tape.

Figure 4:
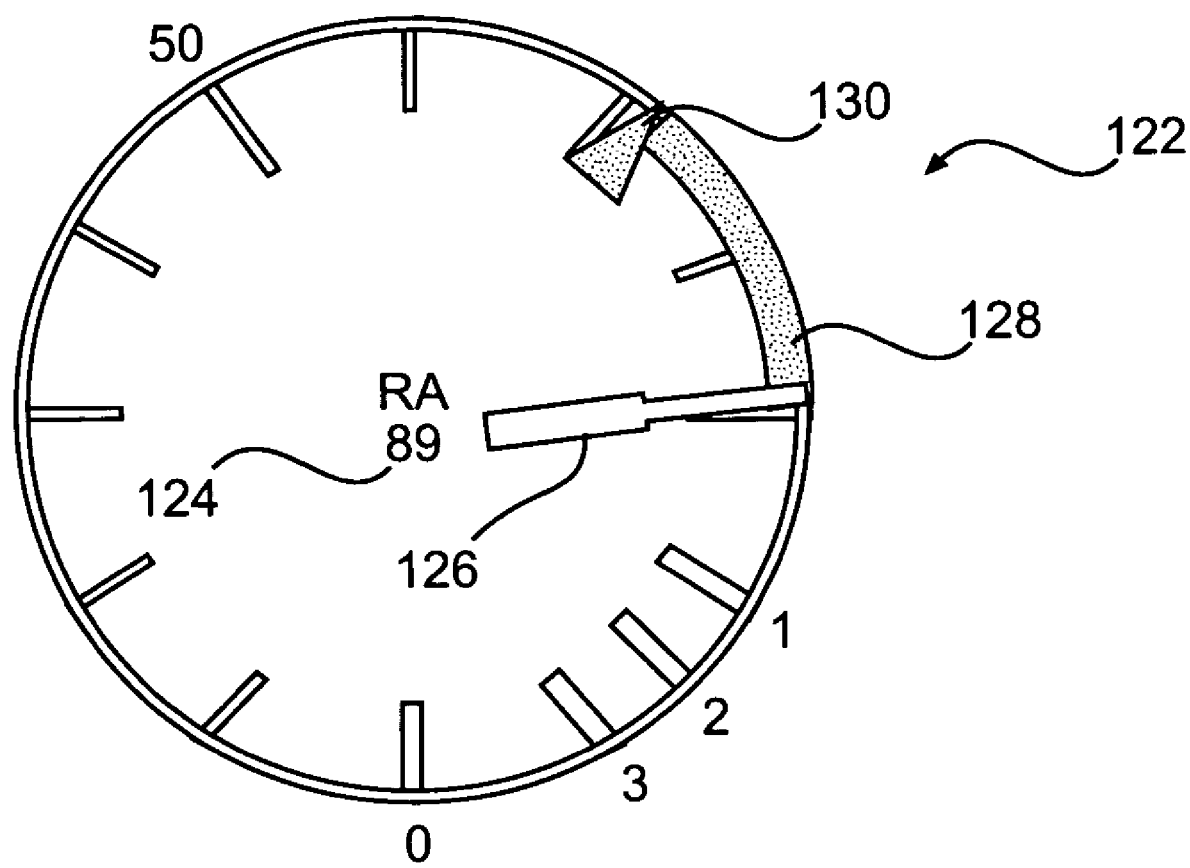
FIG. 4 is a primary flight display which includes a hover display and a radar altitude display according to the present invention.
Figure 5:
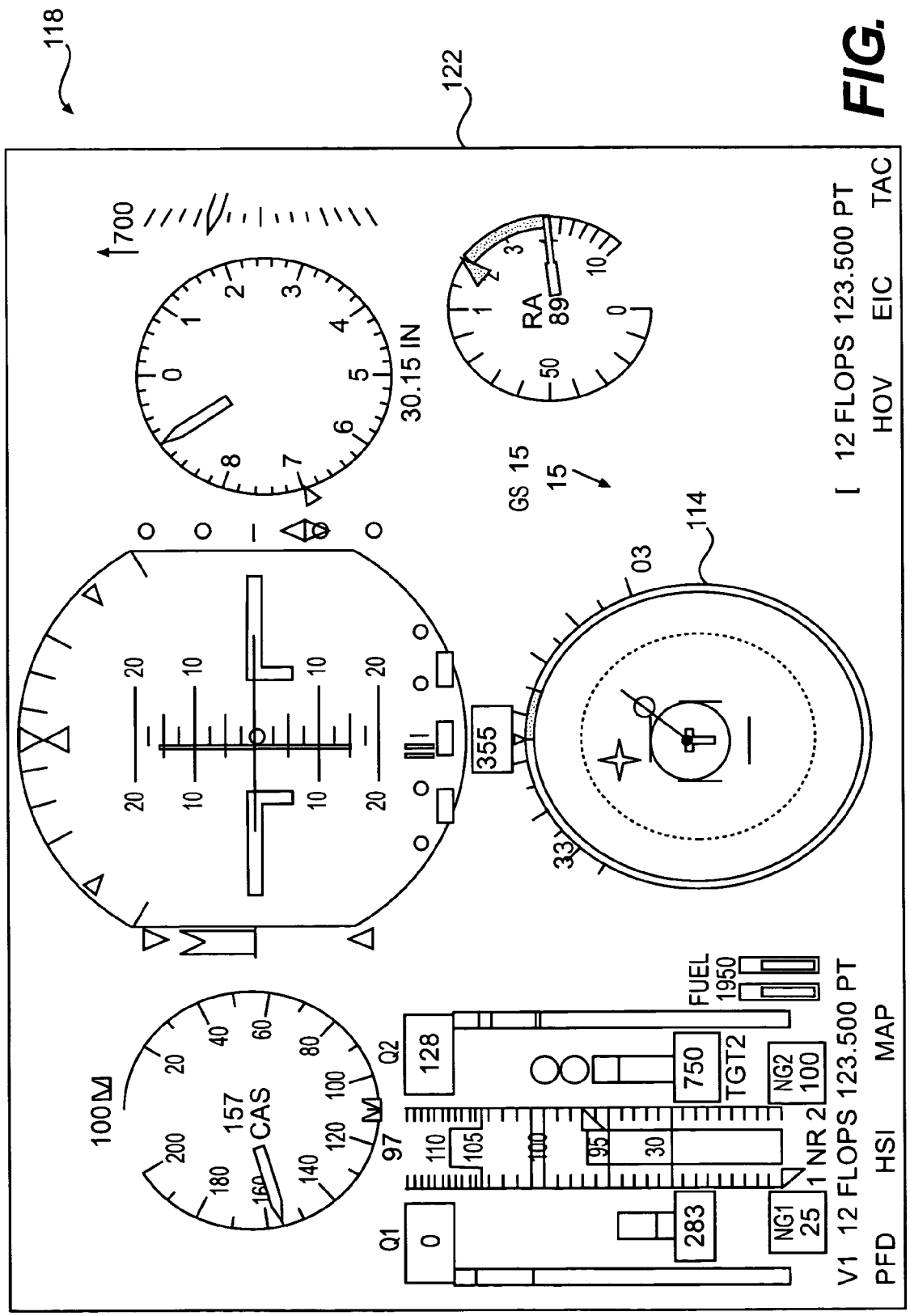
FIG. 5 is a radar altitude display according to the present invention.

Referring to FIG. 4, a radar altitude display 122 is preferably incorporated into the primary flight display 118 (FIG. 5). It should be understood that although a round dial-like display is illustrated in the disclosed embodiment of FIG. 4, the present invention may also utilize the tape style display symbology (illustrated in FIG. 2).

The radar altitude display 122 (FIG. 4) displays the current value of height above ground (displayed here as 89 feet), which is shown by the digital readout in the center of the display as a numerical value 124 as well as by a needle 126 pointing to a value on the dial analog scale. Preferably, the altitude is determined by a radar altimeter in the sensor system S (FIG. 1), however, other sensor information may also be used to obtain the current radar altitude.

An altitude ascent/descent trend tape 128 is overlaid on the radar altitude scale, to indicate the radar altitude trend. The trend tape projects from the current value of height above ground pointer, along the arc of the dial, to a future value of height above ground on the same analog scale as the current reading. A pointer 130 may be located at the end of the altitude ascent/descent trend tape 128 to enhance the readability of the future value of radar altitude. The length of the altitude ascent/descent trend tape 128 preferably is determined by the following algorithm:

Future altitude=Current value of radar altitude+(Rate of closure*Predictor Time Constant)

Where:

Rate of closure=moving average of value of radar altitude over a period of time. Predictor time constant=amount of time in the future to compute the radar altitude. That is, the Predictor time constant represents the amount of time to which the altitude will reach at the current rate. The intent of this combination is to provide enough data to time-average, over a short period of time, to get a smooth, but accurate representation of the current closure rate to the ground. Thus, for example, the Rate of Closure may be calculate over a period of two seconds, sampled at 10 HZ and measured in feet per second while the Predictor time constant may be set at 6 seconds. However, as ready appreciated by one of ordinary skill in the art, all of these numbers can be varied for a specific application. Negative values indicate descent, positive value indicates ascent.

Figure 6A:
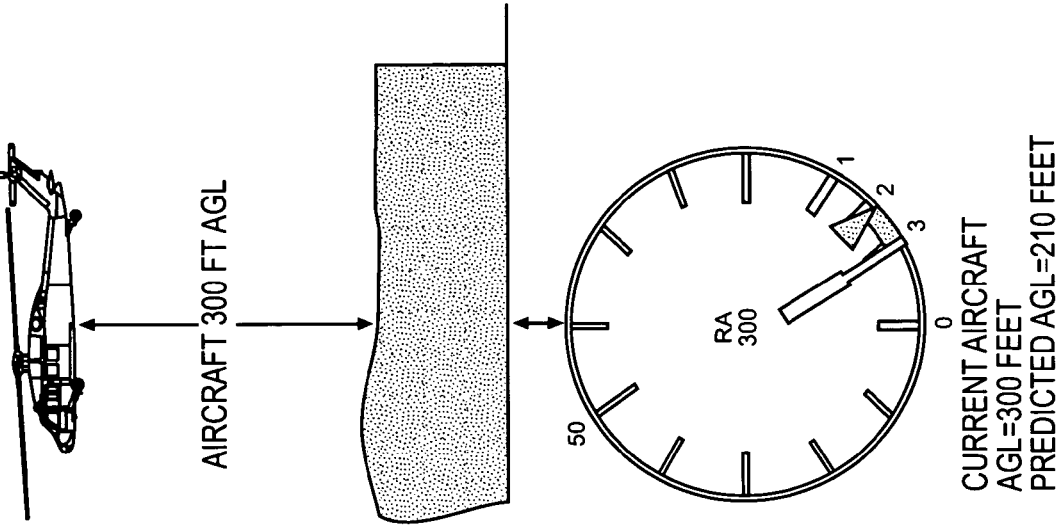
FIG. 6A is the radar altimeter display of FIG. 4 displaying symbology illustrating the aircraft decreasing in altitude.
Figure 6B:
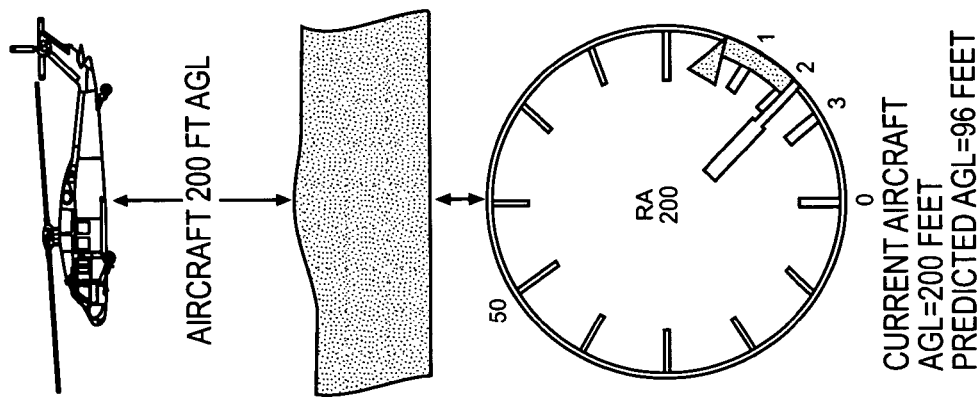
FIG. 6B is the radar altimeter display of FIG. 4 displaying symbology illustrating the aircraft continuing to decrease in altitude.
Figure 6C:
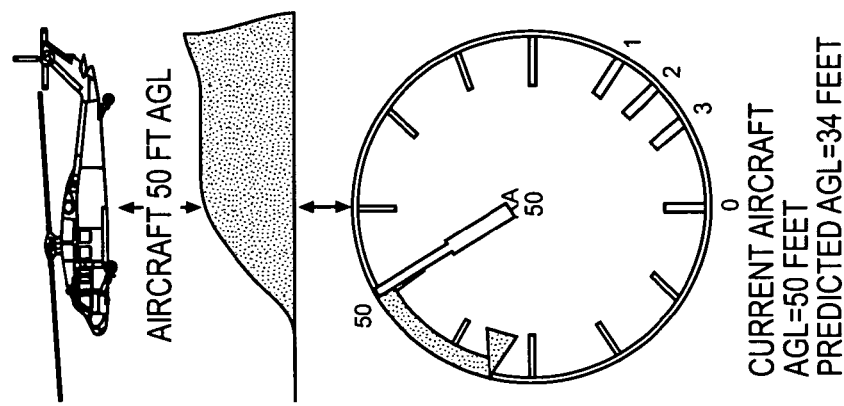
FIG. 6C is the radar altimeter display of FIG. 4 displaying symbology illustrating the aircraft continuing to decreasing in altitude.

Referring to FIGS. 6A–6C, the radar altitude display 122 symbolizes to the pilot that the aircraft is moving forward and descending from 300 feet AGL as indicated by the pointer 130 (FIG. 6A). Notably, the altitude ascent/descent trend tape 128 provides a predicted AGL of approximately 210 feet. Referring to FIG. 6B, the aircraft is continuing to decrease in altitude and is currently at 200 feet AGL as indicated by the pointer 130. However, aircraft descent is accelerating as indicated by the increase in the length of the altitude ascent/descent trend tape 128 which is indicating a predicted AGL of approximately 96 feet. As illustrated in FIG. 6C, the aircraft is continuing to decrease in altitude and is currently at 50 feet AGL as indicated by the pointer 130 while the length of the altitude ascent/descent trend tape 128 is indicating a predicted AGL of approximately 34 feet two seconds into the future.

The altitude ascent/descent trend tape 128 is preferably color-coded to provide a further indication of altitude decrease, such as, for example, green for below an acceptable descent rate relative to the aircraft height above ground level, yellow for close to descent limits, or red for above descent limits. The limits preferably relate current altitude to predicted altitude to provide a warning when a rate of closure to the ground is above an acceptable limit. In other words, a descent rate at a high altitude may be acceptable while the same descent rate at a low altitude would be unacceptable.

Notably, the radar altitude display 122 of the present invention provides an estimated rate of closure to the ground. Providing trend indications, such as, the rate of closure to the ground overlaid on the analog radar altitude indicator greatly assists a pilot in DVE conditions by reducing pilot workload.

Figure 7:
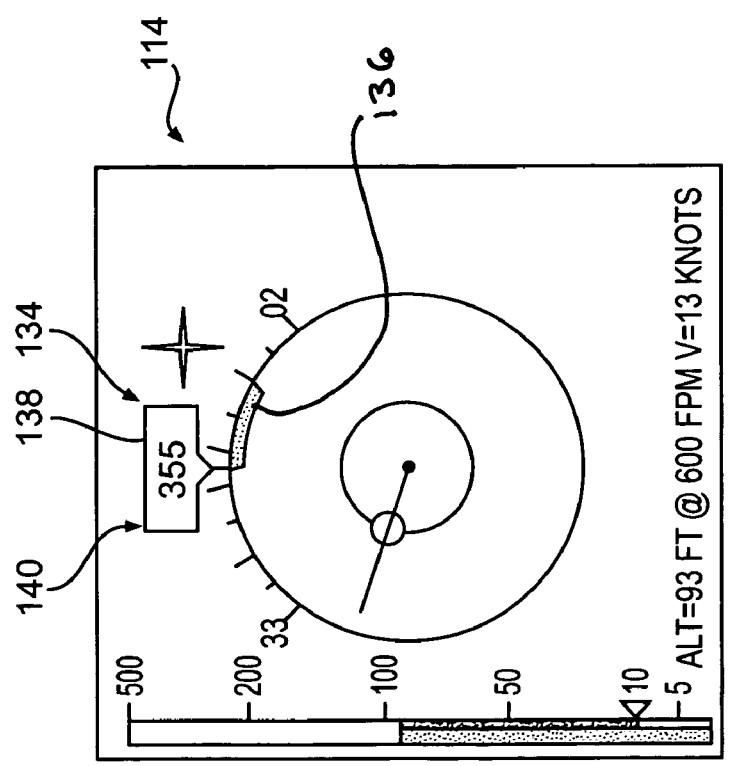
FIG. 7 is the hover display of FIG. 2 displaying a heading drift symbology according to the present invention.

Referring to FIG. 7, the hover display 114 may also include heading drift symbology 134. Notably, the heading drift symbology 134 is also displayed on the hover display 114 in combination with, inter alia, (1) the distance (relative position between current aircraft position and desired landing point), (2) the aircraft velocity (velocity vector), and (3) the aircraft acceleration (acceleration ball movement relative velocity vector) as discussed above. This integrated symbology format greatly assists a pilot's approach, hover, and landing/take-off in a DVE condition by reducing pilot workload The heading drift symbology 134 may also include a heading error deviation bar 136. It should be understood that the term "bar" is for descriptive purposes only and that although a round dial-like display with an arcuate "bar" is illustrated in the disclosed embodiment, the present invention may alternatively utilize a tape style display symbology.

The heading error deviation bar 136 is preferably color-coded and extends from the current aircraft heading 138 depicted in a compass rose 140 as part of the hover display 114. The heading deviation bar grows in proportion to heading changes to indicate deviation from a desired approach heading (here displayed as 010).

The heading error deviation bar 136 provides a symbolic representation of heading drift. For example, if the aircraft turns/yaws right, the error bar will "grow" from the right side of the existing heading. Should the aircraft turn back to the original heading, the error bar will retract and disappear from the display. The heading error deviation bar 136 is preferably color coded so that, for example, the bar is displayed green when heading drift is between 0–3 degrees and yellow when greater than 3 degrees. The length of the heading error deviation bar 136 is determined by the difference between the existing heading and the desired heading at the beginning of the approach. The heading drift error bar 136 is preferably at a 1:1 scaling and serves to visually connect these two heading references. That is, at the time the pilot sets up to fly a DVE approach, the flight control system 100 has determined or has been programmed with the desired approach heading to the landing zone via GPS/INS or other navigational information. The heading error deviation bar 136 is then referenced to that desired heading.

Figure 8:
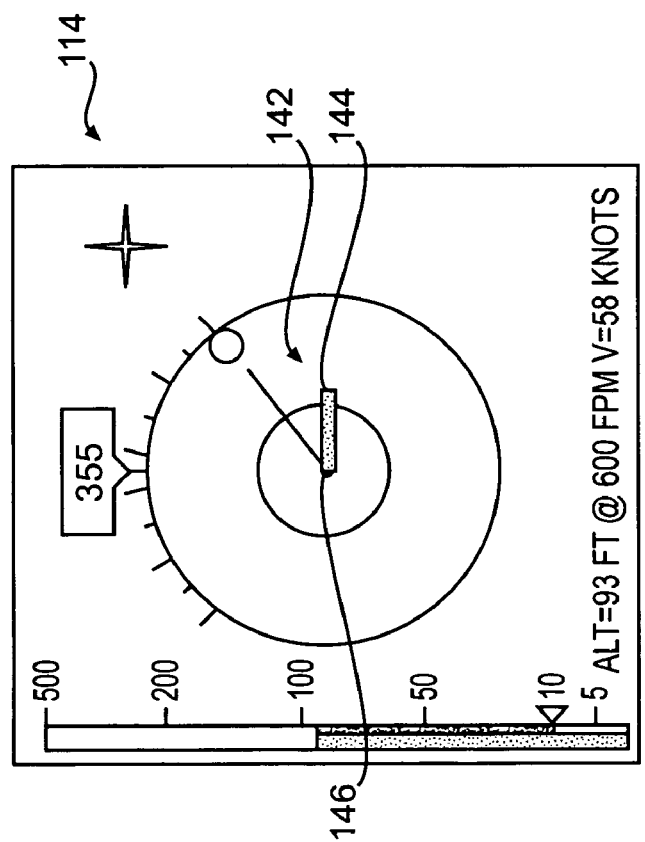
FIG. 8 is the hover display of FIG. 2 displaying a lateral error deviation symbology according to the present invention.

Referring to FIG. 8, the hover display 114 may also include lateral drift symbology 142. Notably, the lateral drift symbology 142 is also displayed on the hover display 114 which, as previously stated, combines, inter alia, (1) the distance (relative position between current aircraft position and desired landing point), (2) the aircraft velocity (velocity vector), and (3) the aircraft acceleration (acceleration ball movement relative velocity vector). This integrated symbology format greatly assists a pilot's approach, hover, and landing/take-off in a DVE condition by reducing pilot workload.

The lateral draft symbology 142 preferably includes a color-coded lateral error bar 144 that that extends from the aircraft current position point 146 which is located in the center of the hover display 114. It should be understood that the aircraft current position point 146 may be depicted as, for example, a dot or aircraft shaped symbol. The lateral error deviation bar 144 is preferably related to the aircraft ground speed such that the bar 144 increases in proportion to the ground speed to indicate to the pilot that lateral velocity is greater than zero. Thus, the lateral error deviation bar 144 provides a symbolic representation of left or right lateral drift.

As representatively illustrated in FIG. 8, for example, when the aircraft is drifting right, the lateral error bar 144 will extend from the right side of the aircraft current position point 146. Should the aircraft zero its lateral drift, the lateral drift error bar 144 will retract and disappear from the display. Preferably, the lateral error deviation bar 144 is color-coded such that, for example, the lateral error deviation bar 144 is green when the lateral drift is between 0–2 knots and yellow when greater than 2 knots.

Figure 9:
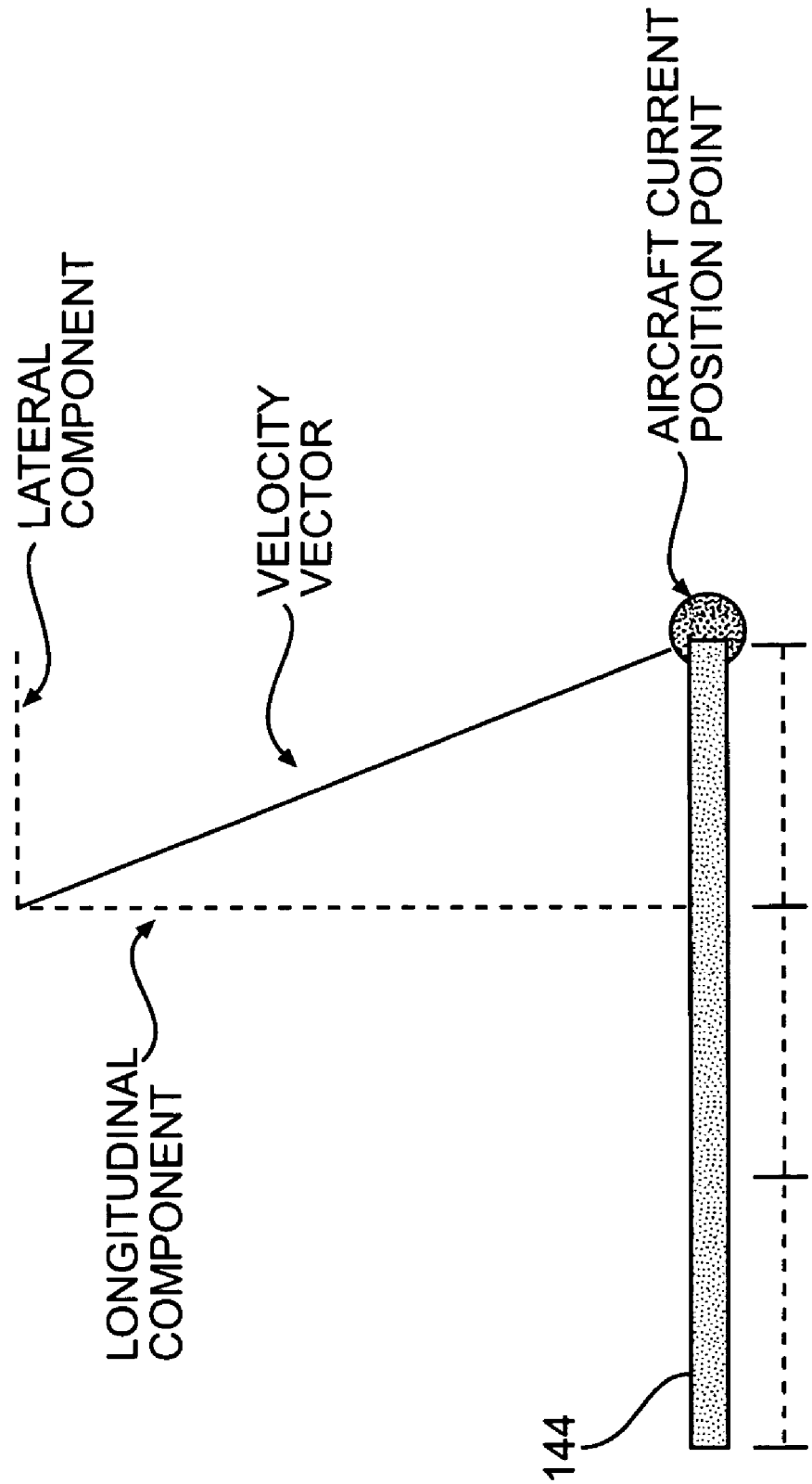
FIG. 9 schematically illustrated calculation of the lateral error deviation symbology.

Referring to FIG. 9, the length of the lateral error deviation bar 144 may be determined by calculating the lateral component of the velocity vector (also illustrated in FIG. 2) and multiplying by a scale factor which is typically dependent on the display capability (here, the scale factor is "3"). In other words, the lateral component of the velocity vector is multiplied by the scaling factor to better assist the pilot with visualization.

The heading drift symbology 134 and the lateral draft symbology 142 as described herein assist pilots in the detection of heading drift and lateral drift, common in DVE situations. The symbology provides pilots with a salient cue pertinent to the approach to hover and landing. It should be understood that although altitude ascent/descent trend, heading drift and lateral drift are discussed separately in the above descriptions, each are preferably combined into the single hover display 114 on the primary flight display 118 (FIG. 5) to minimize the necessity of scanning a multiple of instruments during a DVE condition landing. However, any combination or sub combination of such symbology will also be usable with the present invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A system to enhance situational awareness in a rotary wing aircraft operating in a degraded visual environment (DVE), comprising:
   a sensor system that receives a multitude of environmental information;
   a data fusion processor in communication with said sensor system which compiles said environmental information into a combined output; and
   a display in communication with said data fusion processor, said display generating a hover display in response to said combined output to display a heading drift symbology and a lateral drift symbology wherein said lateral drift symbology includes a lateral drift error bar which extends from an aircraft current position point symbol.

2. The system as recited in claim 1, wherein said lateral drift error bar is color-coded.

3. The system as recited in claim 1, wherein said lateral drift error bar is related to a lateral component of a velocity vector which extends from a aircraft current position point.

4. The system as recited in claim 2, wherein said lateral drift error bar extends for a length related to a lateral component of a velocity vector multiplied by a scaling factor.

5. A system to enhance situational awareness in a rotary wing aircraft operating in a degraded visual environment (DVE), comprising;
   a sensor system that receives a multitude of environmental information;
   a data fusion processor in communication with said sensor system which compiles said environmental information into a combined output; and
   a display in communication with said data fusion processor, said display generating a hover display in response to said combined output to display a heading drift symbology and a lateral drift symbology wherein said heading drift symbology includes a heading error deviation bar which extends from an aircraft desired heading.

6. The system as recited in claim 5, wherein said heading error deviation bar extends between said aircraft desired heading and a current heading.

7. The system as recited in claim 6, wherein said heading error deviation bar is superimposed upon a compass rose displayed on said hover display.

8. The system as recited in claim 5, wherein said heading error deviation bar is color-coded.

9. The system as recited in claim 1, further comprising a radar altitude display which displays a current above ground level (AGL) height and an altitude ascent/descent trend tape which represents a future altitude.

10. The system as recited in claim 9, wherein said altitude ascent/descent trend tape is overlaid upon an arc of a radar altitude display dial, said altitude ascent/descent trend tape extending from a pointer which represents said current AGL height.

11. The system as recited in claim 9, wherein said altitude ascent/descent trend tape is calculated by the algorithm: Future altitude=Current value of radar altitude+(Rate of closure * predictor time constant); where: Rate of closure=a moving average of radar altitude for a predetermined time period; and Predictor time constant=amount of time in the future to compute radar altitude.

12. A system to enhance situational awareness in a rotary wing aircraft operating in a degraded visual environment (DVE), comprising:

a sensor system that receives a multitude of environmental information;

a data fusion processor in communication with said sensor system which compiles said environmental information into a combined output; and a display in communication with said data fusion processor, said display generating a hover display in response to said combined output to display a heading drift symbology and a lateral drift symbology, said display including:

an aircraft current position point;

an aircraft velocity vector which extends from said aircraft current position point to indicate a velocity and direction of the aircraft relative the aircraft current position point; and an acceleration ball which translates relative an end of said velocity vector opposite said aircraft current position point to indicate a velocity trend of the aircraft;

said lateral drift symbology includes a lateral drift error bar which extends from said aircraft current position point.

13. The system as recited in claim 12, wherein said heading drift symbology includes a heading error deviation bar which extends from an aircraft desired heading superimposed upon a compass rose which surrounds said aircraft current position.

14. A method to facilitate flying a rotary wing aircraft in a degraded visual environment (DVE) comprising the steps of:

(1) fusing a multitude of environmental information into a combined output;

(2) generating a heading drift symbology and a lateral drift symbology in response to the combined output which represents an aircraft heading drift and an aircraft lateral drift, respectively; and (3) displaying the heading drift symbology and the lateral drift symbology on a single hover display and displaying the lateral drift symbology as a lateral drift error bar which extends from an aircraft current position point symbol on the hover display.

15. A method to facilitate flying a rotary wing aircraft in a degraded visual environment (DVE) compromising the steps of:

(1) fusing a multitude of environmental information into a combined output;

(2) generating a heading drift symbology and a lateral drift symbology in response to the combined output which represents an aircraft heading drift and an aircraft lateral drift, respectively; and (3) displaying the heading drift symbology and the lateral drift symbology on a single hover display and displaying the heading drift symbology as a heading drift error bar which extends between an aircraft desired heading and an aircraft current heading.

* * * * *